United States Patent
Boone et al.

(10) Patent No.: US 12,530,641 B2
(45) Date of Patent: Jan. 20, 2026

(54) AGGREGATED CAPABILITY DERIVED FROM WORKERS' SKILLS AND WEARABLE ROBOTIC SYSTEMS' CAPABILITIES

(71) Applicant: International Business Machines Corporation, Armonk, NY (US)

(72) Inventors: Michael Boone, Lutz, FL (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 18/456,803

(22) Filed: Aug. 28, 2023

(65) Prior Publication Data
US 2025/0077996 A1    Mar. 6, 2025

(51) Int. Cl.
*G06Q 10/0631* (2023.01)
*G06Q 10/0639* (2023.01)

(52) U.S. Cl.
CPC ........... *G06Q 10/063114* (2013.01); *G06Q 10/06398* (2013.01)

(58) Field of Classification Search
CPC .......... G06Q 10/063; G06Q 10/06398; G06Q 10/0639; G06Q 10/063114
See application file for complete search history.

(56) References Cited

U.S. PATENT DOCUMENTS

| | | |
|---|---|---|
| 8,702,632 B2 | 4/2014 | Han et al. |
| 10,086,513 B2 | 10/2018 | Park et al. |
| 2013/0204435 A1 | 8/2013 | Moon et al. |
| 2017/0165833 A1 | 6/2017 | Park et al. |
| 2017/0361460 A1* | 12/2017 | Boss ................. B25J 9/0072 |
| 2019/0224841 A1* | 7/2019 | Ly ..................... A61B 5/4504 |
| 2021/0315764 A1 | 10/2021 | DeCastro et al. |
| 2022/0223270 A1* | 7/2022 | Masson ............... G16H 40/20 |

(Continued)

OTHER PUBLICATIONS

A. Calanca et al., "Actuation selection for assistive exoskeletons: Matching capabilities to task requirements", IEEE Trans. Neural Syst. Rehabil. Eng., vol. 28, No. 9, pp. 2053-2062, Sep. 2020. (Year: 2020).*

(Continued)

*Primary Examiner* — William S Brockington, III
(74) *Attorney, Agent, or Firm* — Yee & Associates, P.C.

(57) ABSTRACT

Aggregating worker skills and wearable robotic system capabilities is provided. Details of an activity that a worker is preparing to perform utilizing a wearable robotic system are retrieved. Skills of the worker related to the activity are retrieved. Capabilities of the wearable robotic system related to the activity are retrieved. An analysis of the details of the activity that the worker is preparing to perform utilizing the wearable robotic system, the skills of the worker, and the capabilities of the wearable robotic system is performed. An aggregation of the skills of the worker and the capabilities of the wearable robotic system to perform the activity is determined based on the analysis. It is determined that the worker can perform the activity utilizing the wearable robotic system based on the aggregation of the skills of the worker and the capabilities of the wearable robotic system.

20 Claims, 5 Drawing Sheets

(56) References Cited

U.S. PATENT DOCUMENTS

2022/0313118 A1    10/2022  Elhawary et al.
2022/0354597 A1*   11/2022  Kaouk ................ A61B 34/20
2023/0058389 A1     2/2023  Kaveny et al.

OTHER PUBLICATIONS

Anonymous, "Method and System for Collaborative Decision-Making Computation with a Human Worker and a Robotic Worker," An IP.com Prior Art Database Technical Disclosure, IPCOM000271811D, Feb. 14, 2023, 3 pages.

Hyundai, "Huyandai Develops Wearable Vest Exoskeleton for Overhead Work," Huydai Newsroom, Apr. 9, 2019, 11 pages, Huyandai Motor Company, accessed Aug. 15, 2023, https://www.hyundai.news/eu/articles/press-releases/hyundai-develops-wearable-vest-exoskeleton-for-overhead-work.html.

Hyundai and Kia's Wearable Robot: VEX(Vest EXoskeleton), Retrieved from : https://web.archive.org/web/20201020193413/https://tech.hyundaimotorgroup.com/article/hyundai-and-kias-wearable-robot-vexvest-exoskeleton/, Oct. 20, 2020, 15 pages.

* cited by examiner

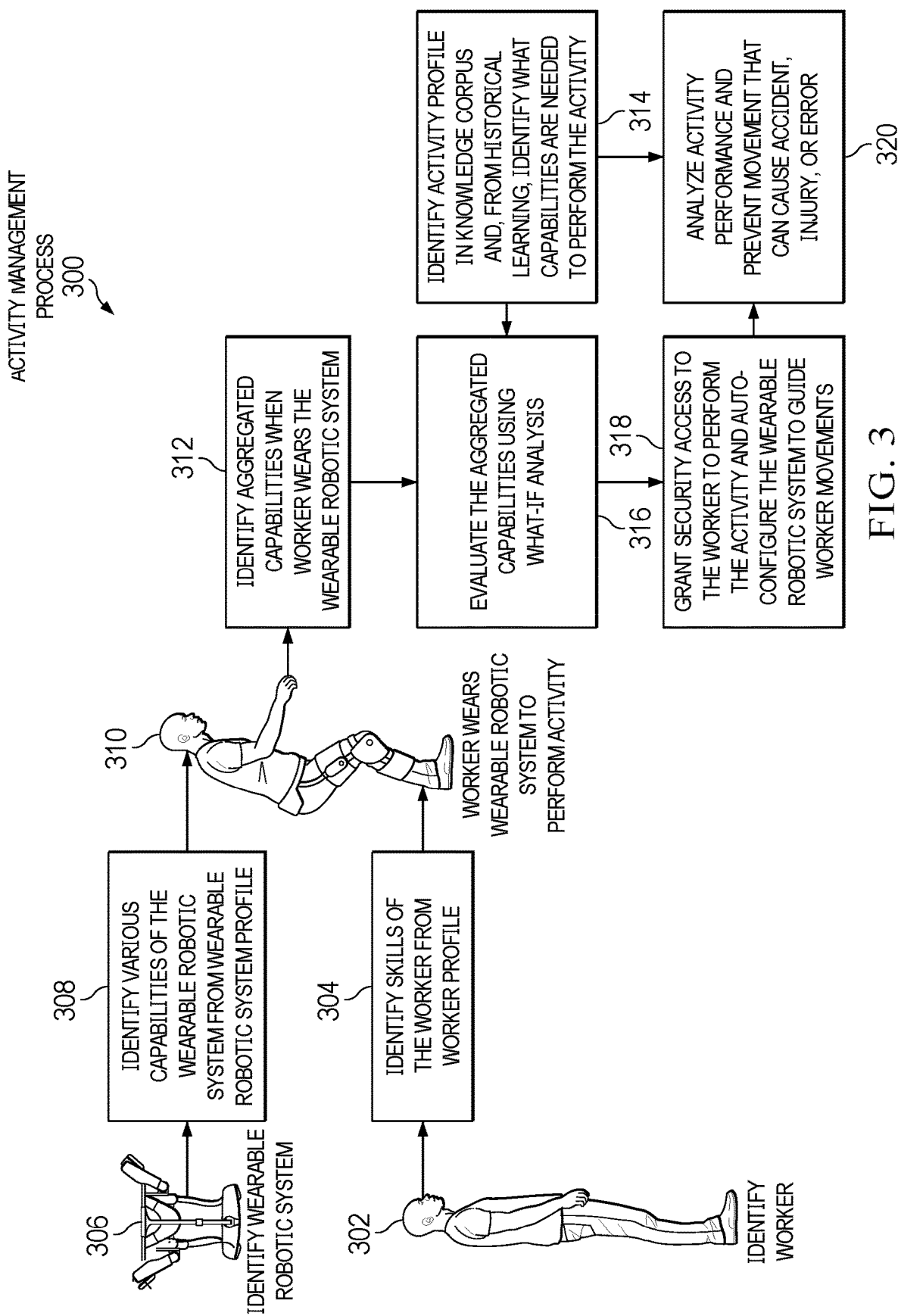

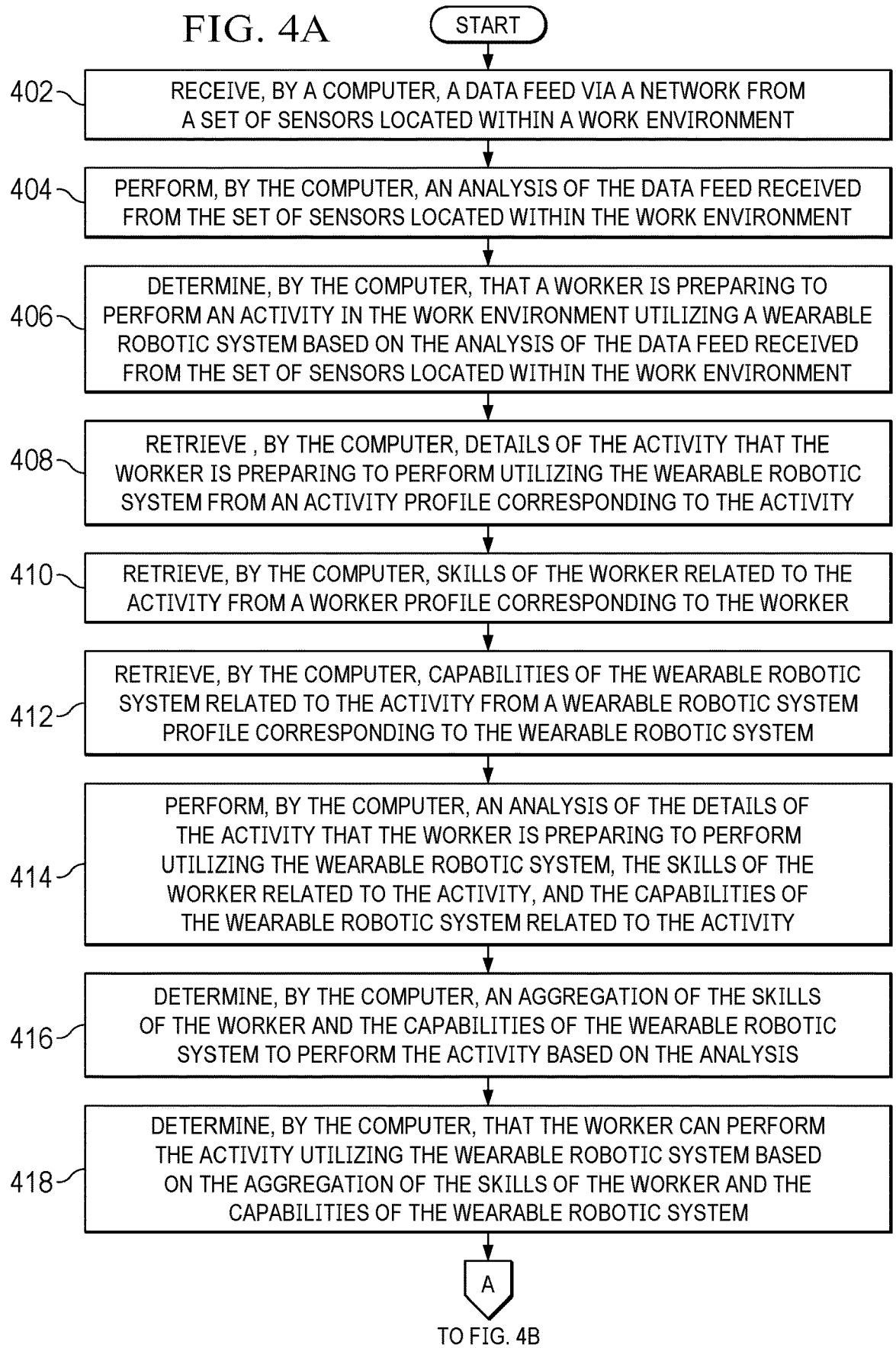

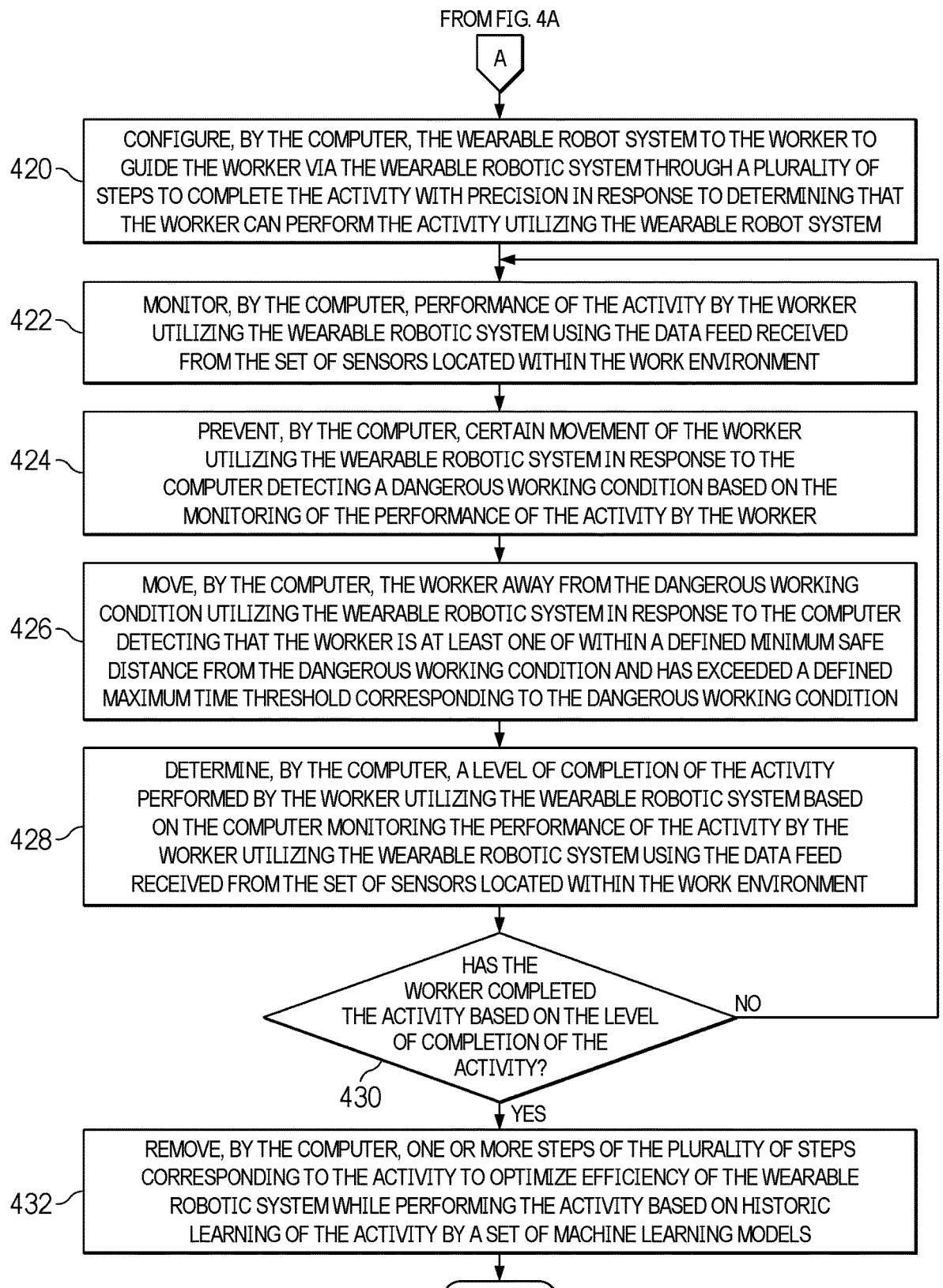

AGGREGATED CAPABILITY DERIVED FROM WORKERS' SKILLS AND WEARABLE ROBOTIC SYSTEMS' CAPABILITIES

BACKGROUND

The disclosure relates generally to work environments and more specifically to wearable robotic systems utilized in work environments.

In any work environment (e.g., industrial floor, machine shop, production line, manufacturing plant, or the like) workers perform different types of activities, such as assembling machine parts, assembling products, fixing defective machines, moving products, and the like. The different types of activities may require, for example, different worker skills, different levels of safety precautions, and the like. A worker and a wearable robotic system can function in a collaborative manner to complete an activity together in a work environment. For example, upon wearing a wearable robotic system, a worker gains additional capabilities, which can include performing specific types of activities, increasing worker strength, and the like.

SUMMARY

According to one illustrative embodiment, a computer-implemented method for aggregating worker skills and wearable robotic system capabilities is provided. A computer retrieves details of an activity that a worker is preparing to perform utilizing a wearable robotic system from an activity profile. The computer retrieves skills of the worker related to the activity from a worker profile. The computer retrieves capabilities of the wearable robotic system related to the activity from a wearable robotic system profile. The computer performs an analysis of the details of the activity that the worker is preparing to perform utilizing the wearable robotic system, the skills of the worker related to the activity, and the capabilities of the wearable robotic system related to the activity. The computer determines an aggregation of the skills of the worker and the capabilities of the wearable robotic system to perform the activity based on the analysis. The computer determines that the worker can perform the activity utilizing the wearable robotic system based on the aggregation of the skills of the worker and the capabilities of the wearable robotic system. According to other illustrative embodiments, a computer system and computer program product for aggregating worker skills and wearable robotic system capabilities are provided.

BRIEF DESCRIPTION OF THE DRAWINGS

FIG. 3 is a diagram illustrating an example of an activity management process in accordance with an illustrative embodiment; and FIGS. 4A-4B are a flowchart illustrating a process for aggregating worker skills and wearable robotic system capabilities in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
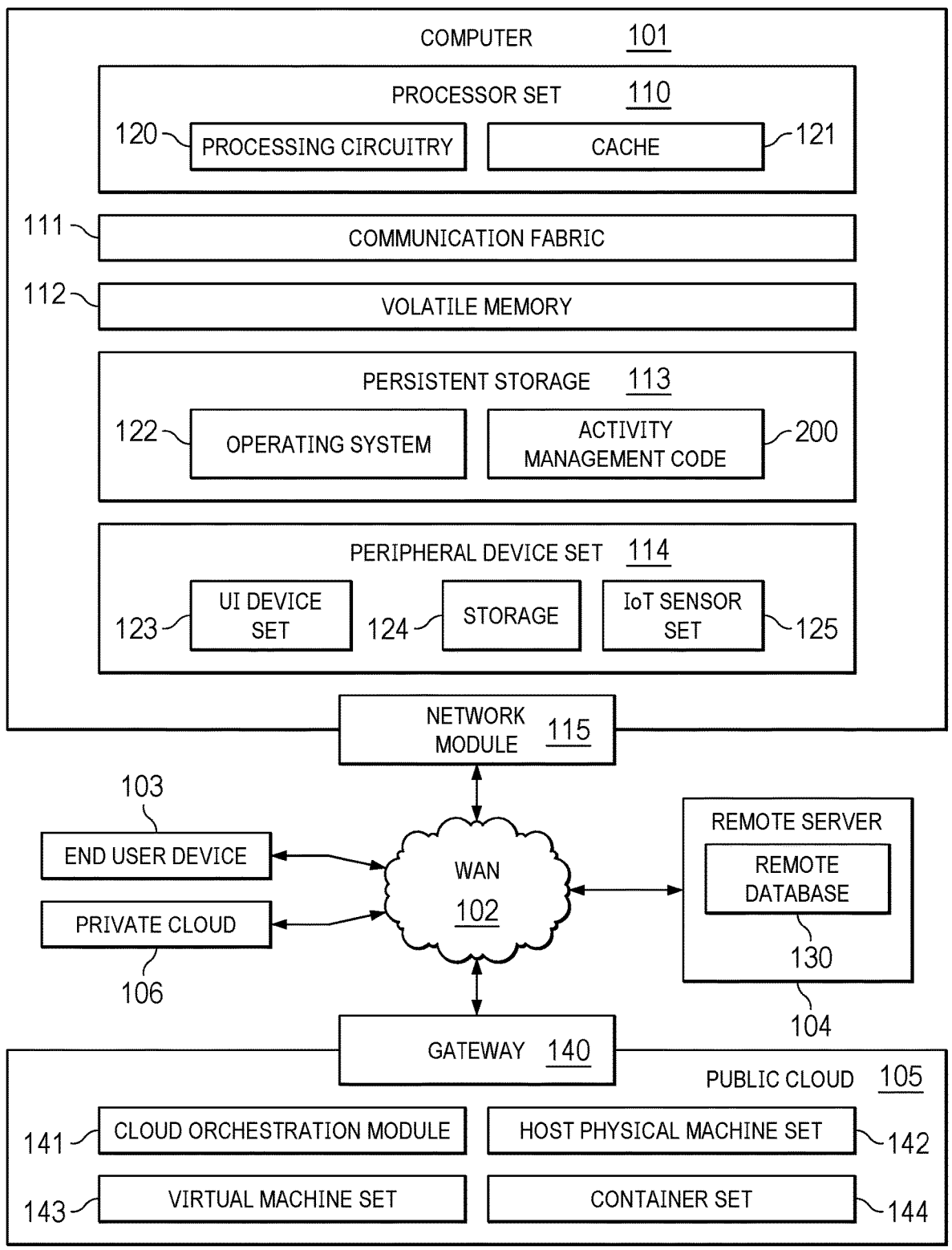
FIG. 1 is a pictorial representation of a computing environment in which illustrative embodiments may be implemented.
Figure 2:
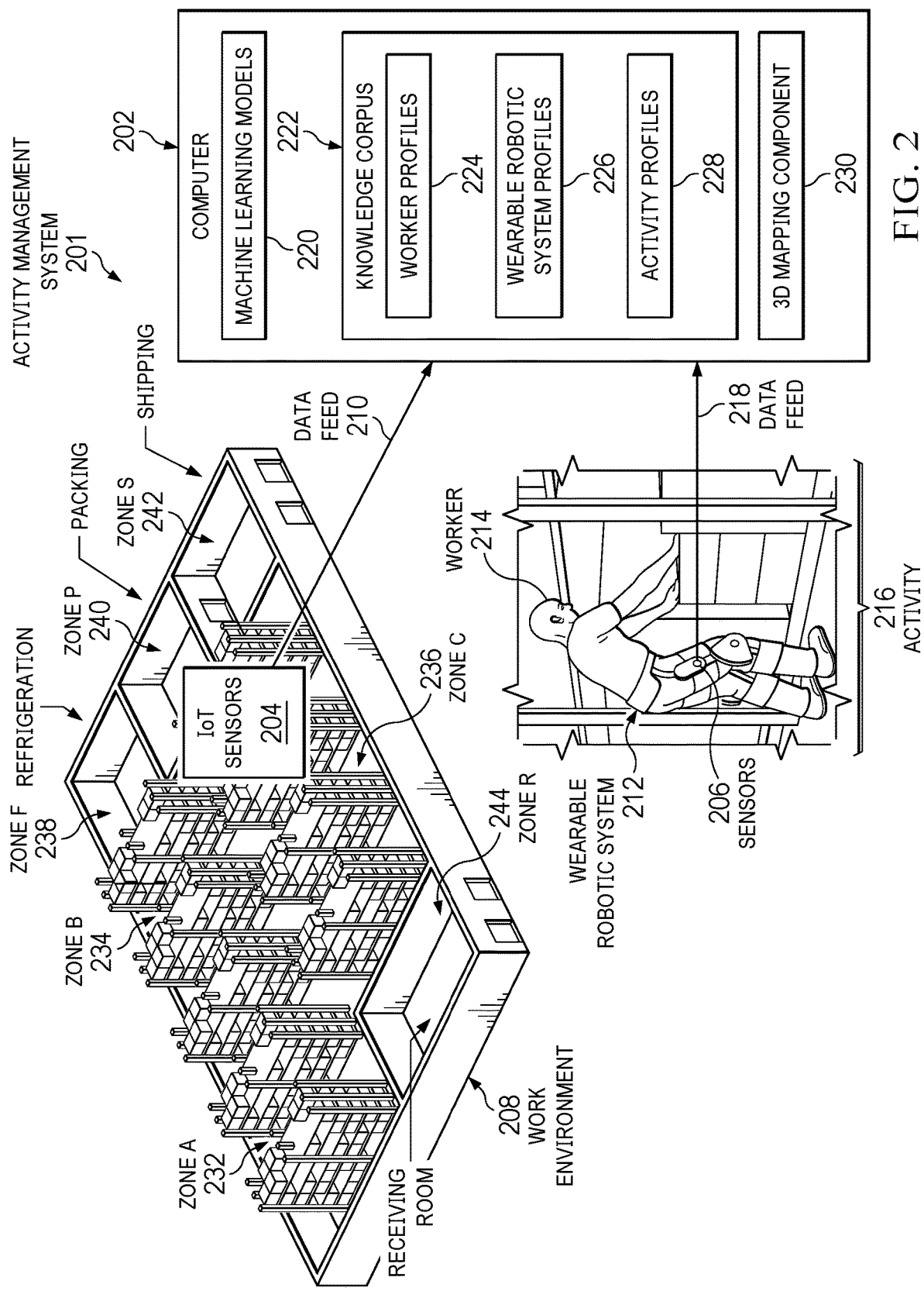
FIG. 2 is a diagram illustrating an example of an activity management system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as activity management code 200.

For example, activity management code 200 analyzes attributes of a physical activity (e.g., activity context, criticality, nature, quality, and the like) performed in a work environment, such as an industrial floor, machine shop, production line, manufacturing plant, or the like. Activity management code 200 identifies mobility requirements of the physical activity and auto-configures a wearable robot system for a worker (e.g., user of the wearable robotic system) in response to activity management code 200 determining that the worker needs the wearable robot system to perform the physical activity based on the surrounding context, such as, for example, type of the activity, difficulty of the activity, needed precision of the activity, safety requirements of the activity, quality of the activity, repetition of the activity, slippery floor, hot objects in area, positioning of a needed tool, or the like, to prevent dangerous working conditions in different activity zones of the work environment.

Activity management code 200 aggregates skills of the worker with capabilities of the wearable robotic system to increase activity performance, increase activity precision, decrease worker fatigue, and provide appropriate safety in the work environment. For example, activity management code 200 uniquely identifies the worker via, for example, badge identification chip, badge barcode, badge quick response code, radio frequency identification tag, or the like, and automatically configures the wearable robotic system to that particular worker for efficient activity execution. In other words, activity management code 200 implements access control to a wearable robotic system by a worker based on the worker's skills identified in a worker profile, ensuring that only workers with the needed skills can engage in specific activities using a wearable robotic system.

Further, activity management code 200 identifies whether the worker is properly wearing the wearable robotic system to perform an activity using a set of real time Internet of Things (IoT) data feeds received from a set of IoT sensors (e.g., cameras, microphones, motion detectors, temperature detectors, and the like) located in the work environment and/or data feeds from a set of sensors located on the wearable robotic system. If activity management code 200 identifies that the worker is not properly wearing the wearable robotic system to perform the activity, then activity management code 200 notifies the worker immediately to reposition the wearable robotic system or obtain a new wearable robotic system that fits the worker properly. The wearable robotic system is an automated mechanical device comprised of a plurality of movable components designed to assist the worker in performance of one or more activities.

Furthermore, activity management code 200 analyzes the set of real time IoT data feeds received from the set of IoT sensors located in the work environment and the data feeds from the set of sensors on the wearable robotic system to identify how the worker is performing the activity and, thus, enables appropriate mobility controls of the wearable robotic system for the worker to perform the activity safely and with precision without errors (i.e., without causing any activity quality issues, accidents, injuries, or mistakes). Activity management code 200 also analyzes an activity profile (e.g., detailed description, defined specification, or the like) outlining the activity to determine whether the activity is being performed correctly based on the received data feeds of the activity. For example, activity management code 200 guides the worker via the wearable robotic system through a plurality of steps needed to complete the activity so that the wearable robotic system controls movements of the worker (e.g., hands, forearms, arms, shoulders, torso, thighs, legs, feet, or the like) to perform the activity correctly reducing the risk of accidents or injuries.

Furthermore, activity management code 200 alerts the worker when the activity cannot be performed by the aggregated capability of the worker and the wearable robotic system. Moreover, activity management code 200 indicates in the alert that one or more other workers should perform the activity with the worker in response to activity management code 200 determining that the aggregation of multiple workers with wearable robotic systems are needed to perform the activity successfully. For example, in response to activity management code 200 determining that multiple workers utilizing wearable robotic systems are needed to perform that particular activity based on aggregation of workers' skills and wearable robotic systems' capabilities, activity management code 200 indicates which particular workers using different wearable robotic systems can perform that particular activity in the work environment. Activity management code 200 utilizes all of this information gained above to build a knowledge corpus based on the context, criticality, and type of the activity to prevent potential issues in the future and enable activity management code 200 to evaluate the skills of the worker based on past activities performed by the worker using wearable robotic systems.

In addition, activity management code 200 can utilize the set of sensors located on the wearable robotic system to identify the attention level of the worker to ensure that the worker is attentive (e.g., the worker is looking at the target area) while performing the activity and providing a warning to the worker when the worker's attention level falls below a defined attention level threshold to prevent injury or activity error. Activity management code 200 also monitors performance of the activity to track the level of completion and removes unnecessary steps of the activity to optimize efficiency and performance of the wearable robotic system while performing the activity. In other words, activity management code 200 establishes the specific steps needed to successfully perform each activity and establishes the optimal sequence of those steps. Thus, activity management code 200 can provide on-the-job training of workers for specific activities in the work environment.

In addition to activity management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and activity management code 200, as identified above), peripheral device set 114 (including user interface (UI) device set 123, storage 124, and IoT sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in activity management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a customer of an entity that operates computer 101), and may take any of the forms discussed above in connection with computer 101. EUD 103 typically receives helpful and useful data from the operations of computer 101. For example, in a hypothetical case where computer 101 is designed to provide an activity management recommendation to the end user, this recommendation would typically be communicated from network module 115 of computer 101 through WAN 102 to EUD 103. In this way, EUD 103 can display, or otherwise present, the recommendation to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide an activity management recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

To perform any activity in a work environment, a worker needs to perform different types of movements using, for example, at least one of hands, arms, torso, legs, feet, and the like. In addition, the worker needs to obtain an appropriate tool (e.g., spanner, wrench, drill, or the like) from a tool storage area (e.g., a toolbox) to perform a particular activity. For example, different activities require different types of tools and different types of worker movements. Further, the worker can be distracted while performing an activity and make an inadvertent mistake causing an accident or injury. Furthermore, while performing an activity, the worker should be performing the activity where needed and not at a place where the activity is not needed, which may cause an accident or injury to occur. Moreover, a wearable robotic system may not have all the different types of capabilities needed to perform a particular activity (e.g., different activities require different capabilities of a wearable robotic system to complete the different activities). Also, if the aggregated capabilities of a human worker using a wearable robotic system do not have the needed level of capability to perform a particular activity, then that worker should not be performing that particular activity. Currently, no solution exists that can automatically configure a wearable robotic system to a particular user based on the context of the activity in order for the worker to perform the activity precisely and safely and prevent worker error or mistake.

Illustrative embodiments analyze attributes, features, characteristics, traits, and the like (e.g., context, criticality, type, quality, and the like) of each particular activity to be performed in a work environment (e.g., industrial floor, machine shop, production line, manufacturing plant, steel mill, or the like). It should be noted that an activity can comprise a plurality of steps or tasks. Illustrative embodiments identify worker mobility requirements of the activity and automatically configure a wearable robotic system to a particular worker based on the analysis of that particular activity should illustrative embodiments determine that the worker needs to utilize a wearable robotic system to perform that particular activity safely and correctly. Thus, illustrative embodiments enable the worker using a wearable robotic system to perform the activity with precision and without creating any activity-related accidents or quality issues. For example, illustrative embodiments guide the worker via the wearable robotic system through a plurality or sequence of steps needed to complete the activity so that the wearable robotic system controls the movements of the worker to perform the activity correctly. Illustrative embodiments also identify the attention level of the worker while performing the activity using a set of real time IoT data feeds to ensure that the worker is attentive, and if not attentive (e.g., the worker is not looking at the target area while performing the activity), illustrative embodiments send an alert or warning to the worker to refocus to prevent accidents or errors while performing the activity.

Illustrative embodiments identify the physical position of the worker relative to the activity in the work environment. While the worker performs the activity, illustrative embodiments identify the plurality of steps comprising the activity and identify the intended next action of the wearable robotic system to guide the movement of the worker at each particular step to complete the activity. In other words, while the worker is performing the activity, the worker is wearing the wearable robotic system to perform the activity. Thus, the wearable robotic system is attached to the worker (e.g., attached to at least one of the torso, arm, hand, and leg of the worker) to guide the worker in performance of the activity (e.g., control a body part, such as a hand, regarding orientation, movement, distance, speed, and the like in relation to the activity). Further, it should be noted that different types of wearable robotic systems perform different types of activities.

Illustrative embodiments determine an aggregation of the skills of the worker and the capabilities of the wearable robotic system to identify which activities can be performed by the worker using that particular wearable robotic system and, accordingly, provide appropriate security access to that particular wearable robotic system by the worker to perform activity in the work environment. For example, illustrative embodiments perform a what-if analysis for the activity to be performed by the worker to validate whether the worker is capable of performing the activity using the wearable robotic system.

In addition, illustrative embodiments identify the context of the area (e.g., slippery floor, hot objects, moving machines, and the like) surrounding the activity within the work environment to identify danger zones and/or objects in the work environment using the real time IoT data feeds from a set of IoT sensors located within the work environment. It should be noted that each wearable robotic system can also be equipped with a set of sensors (e.g., one or more cameras, temperature detectors, sound detectors, motion detectors, and the like) to monitor the area surrounding the activity being performed by the worker. Illustrative embodiments can generate a three-dimensional map of the work environment to include each activity zone, activities performed in each activity zone, number of workers present in each activity zone, movement of workers in each activity zone, danger zones (e.g., zones prone to accidents or injury due to presence of dangerous working conditions), and the like, aiding in accident prevention based on the information received from the set of IoT sensors located throughout the work environment and the set of sensors located on each wearable robotic system worn by workers in the work environment. Moreover, illustrative embodiments identify a boundary (e.g., metal cutting boundary, assembly boundary, heat boundary, sound boundary, and the like) surrounding the activity.

Illustrative embodiments can also disable the wearable robotic system to operate in an identified danger zone (i.e., identified dangerous working condition) by disengaging the wearable robotic system while in the danger zone. In other words, illustrative embodiments prevent the wearable robotic system from allowing the worker to make certain body movements in the danger zone to prevent an accident or injury in response to illustrative embodiments detecting a dangerous working condition based on monitoring performance of the activity by the worker utilizing the wearable robotic system. For example, illustrative embodiments can prevent the wearable robotic system from enabling the worker to make those certain body movements while performing the activity by generating an appropriate physical force to stop the worker from making those certain body movements. Alternatively, illustrative embodiments can direct the wearable robotic system to move the worker away from the dangerous working condition in response to illustrative embodiments detecting, for example, that the worker is at least one of within a defined minimum safe distance from the dangerous working condition or has exceeded a defined maximum time threshold corresponding to the dangerous working condition.

Illustrative embodiments also identify the set of tools needed by the worker to perform the activity and the physical location of those tools within the work environment. In other words, illustrative embodiments identify the relationships between certain tools and that particular activity and the accessibility of those tools to perform that particular activity ensuring that the worker has access to the appropriate tools within the activity zone. Furthermore, illustrative embodiments identify whether any repairs or maintenance corresponding to the activity performed by the worker are needed based on, for example, the real time IoT data feeds, data feeds from the set of sensors located on the wearable robotic system worn by the worker, maintenance schedules, activity profile, and the like.

Illustrative embodiments learn over time using a set of machine learning models (e.g., one or more neural networks, recurrent neural networks, convolutional neural networks, and the like) based on all of this recorded information. Illustrative embodiments use the set of machine learning models to analyze the recorded information to understand the different requirements of various activities performed in the work environment by different workers using different wearable robotic systems. For example, illustrative embodiments use the set of machine learning models to build a knowledge corpus of contextual wearable robotic system-aided activities. Based on historical learning by the set of machine learning models, illustrative embodiments identify the context of an activity, criticality of the activity, type of the activity, number of steps comprising the activity, and the like and accordingly identify what types of mobility are to be performed by a worker to accomplish the activity and what types of mobility are restricted in order to prevent accidents caused by worker mistake. Moreover, based on historical learning by the set of machine learning models, illustrative embodiments can predict aggregation of the worker's skills with a particular wearable robotic system as new activities are assigned to the worker. Thus, based on historical learning, illustrative embodiments identify how each activity is to be performed in the work environment. Furthermore, based on historical learning (e.g., details of the activity previously performed by one or more workers), illustrative embodiments identify which steps of the activity are to be performed and which steps can be eliminated to increase wearable robotic system efficiency and improve overall activity performance. It should be noted that illustrative embodiments have a prerequisite of each worker opting-in and agreeing to have illustrative embodiments monitor movements of the worker while wearing wearable robotic systems to perform different activities and have those movements and corresponding information recorded for historical analysis.

Thus, illustrative embodiments provide one or more technical solutions that overcome a technical problem with an inability of any current solution to automatically configure a wearable robotic system to a particular user based on the context of the activity in order for the worker to perform the activity precisely, safely, and without worker mistake. As a result, these one or more technical solutions provide a technical effect and practical application in the field of wearable robotic systems.

With reference now to FIG. 2, a diagram illustrating an example of an activity management system is depicted in accordance with an illustrative embodiment. Activity management system 201 may be implemented in a computing environment, such as computing environment 100 in FIG. 1. Activity management system 201 is a system of hardware and software components for aggregating worker skills and wearable robotic system capabilities to perform an activity with precision and safety in a work environment.

In this example, activity management system 201 includes computer 202, IoT sensors 204, and sensors 206. Computer 202 may be, for example, computer 101 in FIG. 1. Computer 202 may be located remotely in, for example, a cloud environment providing an activity management service to customers, such as work environment 208. Alternatively, computer 202 may be located on premises in work environment 208. In this example, work environment 208 is a warehouse. However, it should be noted that work environment 208 may represent any type of work environment, such as, for example, an industrial floor, machine shop, production line, manufacturing plant, steel mill, or the like.

IoT sensors 204 represent a set of sensors (e.g., cameras, microphones, motion detectors, temperature detectors, and the like) located in work environment 208. IoT sensors 204 provide data feed 210 to computer 202 on a continuous basis. Data feed 210 represents a real time data feed of workers, activities, objects, and the like within work environment 208.

Sensors 206 are located on wearable robotic system 212 worn by worker 214 while performing activity 216. Sensors 206 represent a set of sensors (e.g., cameras, microphones, motion detectors, temperature detectors, and the like) that provide data feed 218 to computer 202. Data feed 218 represents a real time data feed corresponding to worker 214 performing activity 216 utilizing wearable robotic system 212. It should be noted that worker 214 is performing activity 216 in work environment 208 even though worker 214 is shown outside of work environment 208.

Computer 202 utilizes machine learning models 220 to monitor performance of activity 216 by worker 214 utilizing wearable robotic system 212 based on at least one of data feed 210 and data feed 218. Machine learning models 220 represent a set of one or more different neural networks. Machine learning models 220 analyze data feed 210 and data feed 218 to determine performance, worker safety, and a level of completion of activity 216. In addition, machine learning models 220 perform historical learning of activity 216 and any other activities performed by workers utilizing wearable robotic systems in work environment 208.

Based on the historical learning of activities performed by workers utilizing wearable robotic systems, machine learning models 220 build knowledge corpus 222. Knowledge corpus 222 includes worker profiles 224, wearable robotic system profiles 226, and activity profiles 228. Worker profiles 224 represent a plurality of profiles corresponding to a plurality of different workers and contain information regarding each particular worker's skills (e.g., training, experience, expertise, strength, number of times performing a particular activity, and the like) regarding different activities performed by that particular worker. Wearable robotic system profiles 226 represent a plurality of profiles corresponding to a plurality of different wearable robotic systems and contain information regarding each particular wearable robotic system's capabilities (e.g., power, movements, speed, battery life, and the like) to perform one or more different activities. Activity profiles 228 represent a plurality of profiles corresponding to a plurality of different activities performed by workers in work environment 208 and contain details of each particular activity (e.g., type, location, position, tools needed, number of workers needed, whether wearable robotic systems are needed, and the like).

Computer 202 also includes three-dimensional (3D) mapping component 230. Computer 202 utilizes 3D mapping component 230 to generate a 3D map of work environment 208. The 3D map of work environment 208 can include, for example, each activity zone, activities performed in each activity zone, number of workers present in each activity zone, movement of workers in each activity zone, danger zones having dangerous working conditions, and the like. In this example, work environment 208 includes activity zone A 232, activity zone B 234, activity zone C 236, activity zone F 238, activity zone P 240, activity zone S 242, and activity zone R 244. Activity zone A 232, activity zone B 234, and activity zone C 236 can be, for example, object storage areas. In this example, worker 214 utilizing wearable robotic system 212 can be performing activity 216 in any one of activity zone A 232, activity zone B 234, and activity zone C 236. Activity zone F 238 can be, for example, refrigeration. Activity zone P 240 can be, for example, packing. Activity zone S 242 can be, for example, shipping. Activity zone R 244 can be, for example, a receiving room.

With reference now to FIG. 3, a diagram illustrating an example of an activity management process is depicted in accordance with an illustrative embodiment. Activity management process 300 can be implemented in a computer, such as, for example, computer 101 in FIG. 1 or computer 202 in FIG. 2.

At 302, the computer identifies a worker, such as, for example, worker 214 in FIG. 2, preparing to perform an activity in a work environment, such as, for example, work environment 208 in FIG. 2, utilizing a wearable robotic system. At 304, the computer identifies skills of the worker related to the activity from a worker profile corresponding to the worker.

At 306, the computer identifies the wearable robotic system, such as, for example, wearable robotic system 212 in FIG. 2, to be utilized by the worker to perform the activity. At 308, the computer identifies various capabilities of the wearable robotic system related to the activity from a wearable robotic system profile corresponding to the wearable robotic system.

At 310, the worker wears the wearable robotic system to perform the activity. At 312, the computer identifies aggregated capabilities of the skills of the worker related to the activity and the capabilities of the wearable robotic system to perform the activity when the worker wears the wearable robotic system. At 314, the computer identifies details of the activity from an activity profile corresponding to the activity stored in a knowledge corpus and, from historical learning, the computer identifies what aggregated capabilities are needed to perform the activity.

At 316, the computer, using a what-if analysis, evaluates the aggregated capabilities of the skills of the worker related to the activity and the capabilities of the wearable robotic system related to the activity to perform the activity based on the historical learning. At 318, the computer grants security access to the worker to perform the activity and auto-configures the wearable robotic system to guide worker movements while performing the activity in response to the computer determining that the aggregated capabilities of the skills of the worker related to the activity and the capabilities of the wearable robotic system related to the activity are sufficient to perform the activity correctly and safely. At 320, the computer analyzes performance of the activity using real time data feeds from the work environment and prevents worker movement that can cause an accident, injury, or error.

With reference now to FIGS. 4A-4B, a flowchart illustrating a process for aggregating worker skills and wearable robotic system capabilities is shown in accordance with an illustrative embodiment. The process shown in FIGS. 4A-4B may be implemented in a computer, such as, for example, computer 101 in FIG. 1 or computer 202 in FIG. 2. For example, the process shown in FIGS. 4A-4B may be implemented in activity management code 200 in FIG. 1.

The process begins when the computer receives a data feed via a network from a set of sensors located within a work environment (step 402). The computer performs an analysis of the data feed received from the set of sensors located within the work environment (step 404). The computer determines that a worker is preparing to perform an activity in the work environment utilizing a wearable robotic system based on the analysis of the data feed received from the set of sensors located within the work environment (step 406).

In response to computer determining that the worker is preparing to perform the activity in the work environment utilizing a wearable robotic system, the computer retrieves details of the activity that the worker is preparing to perform utilizing the wearable robotic system from an activity profile corresponding to the activity (step 408).

The computer also retrieves skills of the worker related to the activity from a worker profile corresponding to the worker (step 410). In addition, the computer retrieves capabilities of the wearable robotic system related to the activity from a wearable robotic system profile corresponding to the wearable robotic system (step 412).

The computer performs an analysis of the details of the activity that the worker is preparing to perform utilizing the wearable robotic system, the skills of the worker related to the activity, and the capabilities of the wearable robotic system related to the activity (step 414). The computer determines an aggregation of the skills of the worker and the capabilities of the wearable robotic system to perform the activity based on the analysis (step 416). The computer determines that the worker can perform the activity utilizing the wearable robotic system based on the aggregation of the skills of the worker and the capabilities of the wearable robotic system (step 418).

The computer configures the wearable robot system to the worker to guide the worker via the wearable robotic system through a plurality of steps to complete the activity with precision in response to determining that the worker can perform the activity utilizing the wearable robot system (step 420). The computer monitors performance of the activity by the worker utilizing the wearable robotic system using the data feed received from the set of sensors located within the work environment (step 422).

The computer prevents certain movement of the worker utilizing the wearable robotic system in response to the computer detecting a dangerous working condition based on the monitoring of the performance of the activity by the worker (step 424). Further, the computer moves the worker away from the dangerous working condition utilizing the wearable robotic system in response to the computer detecting that the worker is at least one of within a defined minimum safe distance from the dangerous working condition and has exceeded a defined maximum time threshold corresponding to the dangerous working condition (step 426).

The computer determines a level of completion of the activity performed by the worker utilizing the wearable robotic system based on the computer monitoring the performance of the activity by the worker utilizing the wearable robotic system using the data feed received from the set of sensors located within the work environment (step 428). The computer makes a determination as to whether the worker completed the activity based on the level of completion of the activity (step 430).

If the computer determines that the worker has not completed the activity based on the level of completion of the activity, no output of step 430, then the process returns to step 422 where the computer continues to monitor the performance of the activity by the worker utilizing the wearable robotic system. If the computer determines that the worker has completed the activity based on the level of completion of the activity, yes output of step 430, then the computer removes one or more steps of the plurality of steps corresponding to the activity to optimize efficiency of the wearable robotic system while performing the activity based on historic learning of the activity by a set of machine learning models (step 432). Thereafter, the process terminates.

Thus, illustrative embodiments of the present disclosure provide a computer-implemented method, computer system, and computer program product for aggregating worker skills and wearable robotic system capabilities to perform an activity with precision and safety in a work environment. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving safety and precision in wearable robotic systems, the computer-implemented method comprising:
 receiving, by a computer, real-time data feeds from a set of Internet of Things (IoT) sensors positioned within a work environment;
 retrieving, by the computer, details of an activity that a worker is preparing to perform utilizing a wearable robotic system from an activity profile;
 retrieving, by the computer, skills of the worker related to the activity from a worker profile;
 retrieving, by the computer, capabilities of the wearable robotic system related to the activity from a wearable robotic system profile;
 performing, by the computer, an analysis of the details of the activity that the worker is preparing to perform utilizing the wearable robotic system, the skills of the worker related to the activity, and the capabilities of the wearable robotic system related to the activity;
 determining, by the computer, an aggregation of the skills of the worker and the capabilities of the wearable robotic system to perform the activity based on the analysis;
 determining, by the computer, that the worker can perform the activity utilizing the wearable robotic system based on the aggregation of the skills of the worker and the capabilities of the wearable robotic system;
 automatically configuring, by the computer, physical movement parameters of the wearable robotic system to guide the worker through a plurality of steps to complete the activity;
 monitoring, by the computer, performance of the activity by the worker utilizing the wearable robotic system via the real-time data feeds from the set of IoT sensors;
 analyzing, by the computer, the real-time data feeds to identify a plurality of actionable activities; and
 responsive to identifying the plurality of actionable activities, performing, by the computer, at least one action from the plurality of actionable activities wherein the at least one action further comprises:
 generating, by the computer, physical resistance forces via the wearable robotic system to prevent movement errors of the worker.

2. The computer-implemented method of claim 1, further comprising:
 configuring, by the computer, the wearable robotic system to the worker to guide the worker via the wearable robotic system through a plurality of steps to complete the activity with precision in response to determining that the worker can perform the activity utilizing the wearable robotic system.

3. The computer-implemented method of claim 1, further comprising:
 monitoring, by the computer, performance of the activity by the worker utilizing the wearable robotic system using a data feed received from a set of sensors located within a work environment.

4. The computer-implemented method of claim 1, further comprising:
 identifying, by the computer, a set of prohibited movements for the activity based on the analysis, wherein the set of prohibited movements comprise specific ranges of motion that exceed safety parameters defined in the activity profile;
 continuously monitoring, by the computer, movements of the worker during performance of the activity; and
 preventing, by the computer, the worker from performing any of the set of prohibited movements by automatically controlling the wearable robotic system to restrict motion when the set of IoT sensors detect an attempt to perform any movement in the set of prohibited movements.

5. The computer-implemented method of claim 1, further comprising:
 moving, by the computer, the worker away from a dangerous working condition utilizing the wearable robotic system in response to the computer detecting that the worker is at least one of within a defined minimum safe distance from the dangerous working condition and has exceeded a defined maximum time threshold corresponding to the dangerous working condition.

6. The computer-implemented method of claim 1, further comprising:
 determining, by the computer, a level of completion of the activity performed by the worker utilizing the wearable robotic system based on the computer monitoring performance of the activity by the worker utilizing the wearable robotic system using a data feed received from a set of sensors located within a work environment;
 determining, by the computer, whether the worker completed the activity based on the level of completion of the activity; and
 removing, by the computer, one or more steps of a plurality of steps corresponding to the activity to optimize efficiency of the wearable robotic system while performing the activity based on historic learning of the activity by a set of machine learning models in response to the computer determining that the worker has completed the activity based on the level of completion of the activity.

7. The computer-implemented method of claim 1, further comprising:
 receiving, by the computer, a data feed via a network from a set of sensors located within a work environment;
 performing, by the computer, an analysis of the data feed received from the set of sensors located within the work environment; and
 determining, by the computer, that the worker is preparing to perform the activity in the work environment utilizing the wearable robotic system based on the analysis of the data feed received from the set of sensors located within the work environment.

8. A computer system for improving safety and precision in a wearable robotic system, the computer system comprising:
 a communication fabric;
 a storage device connected to the communication fabric, wherein the storage device stores program instructions; and
 a processor connected to the communication fabric, wherein the processor executes the program instructions to:
 receive real-time data feeds from a set of Internet of Things (IoT) sensors positioned within a work environment;

retrieve details of an activity that a worker is preparing to perform utilizing a wearable robotic system from an activity profile;

retrieve skills of the worker related to the activity from a worker profile;

retrieve capabilities of the wearable robotic system related to the activity from a wearable robotic system profile;

perform an analysis of the details of the activity that the worker is preparing to perform utilizing the wearable robotic system, the skills of the worker related to the activity, and the capabilities of the wearable robotic system related to the activity;

determine an aggregation of the skills of the worker and the capabilities of the wearable robotic system to perform the activity based on the analysis;

determine that the worker can perform the activity utilizing the wearable robotic system based on the aggregation of the skills of the worker and the capabilities of the wearable robotic system;

automatically configure physical movement parameters of the wearable robotic system to guide the worker through a plurality of steps to complete the activity;

monitor performance of the activity by the worker utilizing the wearable robotic system via the real-time data feeds from the set of IoT sensors;

analyze the real-time data feeds to identify a plurality of actionable activities; and responsive to the identifying of the plurality of actionable activities, performing at least one action from the plurality of actionable activities wherein the at least one action further comprises:

generate, by the computer, physical resistance forces via the wearable robotic system to prevent movement errors of the worker.

9. The computer system of claim 8, wherein the processor further executes the program instructions to:

configure the wearable robotic system to the worker to guide the worker via the wearable robotic system through a plurality of steps to complete the activity with precision in response to determining that the worker can perform the activity utilizing the wearable robotic system.

10. The computer system of claim 8, wherein the processor further executes the program instructions to:

monitor performance of the activity by the worker utilizing the wearable robotic system using a data feed received from a set of sensors located within a work environment.

11. The computer system of claim 8, wherein the processor further executes the program instructions to:

identify a set of prohibited movements for the activity based on the analysis, wherein the set of prohibited movements comprise specific ranges of motion that exceed safety parameters defined in the activity profile;

continuously monitor movements of the worker during performance of the activity; and prevent the worker from performing any of the set of prohibited movements by automatically controlling the wearable robotic system to restrict motion when the set of IoT sensors detect an attempt to perform any movement in the set of prohibited movements.

12. The computer system of claim 8, wherein the processor further executes the program instructions to:

move the worker away from a dangerous working condition utilizing the wearable robotic system in response to detecting that the worker is at least one of within a defined minimum safe distance from the dangerous working condition and has exceeded a defined maximum time threshold corresponding to the dangerous working condition.

13. The computer system of claim 8, wherein the processor further executes the program instructions to:

determine a level of completion of the activity performed by the worker utilizing the wearable robotic system based on monitoring performance of the activity by the worker utilizing the wearable robotic system using a data feed received from a set of sensors located within a work environment;

determine whether the worker completed the activity based on the level of completion of the activity; and remove one or more steps of a plurality of steps corresponding to the activity to optimize efficiency of the wearable robotic system while performing the activity based on historic learning of the activity by a set of machine learning models in response to determining that the worker has completed the activity based on the level of completion of the activity.

14. A computer program product for improving safety and precision in wearable robotic system, the computer program product comprising a computer-readable storage medium having program instructions embodied therewith, the program instructions executable by a computer to cause the computer to:

receive real-time data feeds from a set of Internet of Things (IoT) sensors positioned within a work environment;

retrieve details of an activity that a worker is preparing to perform utilizing a wearable robotic system from an activity profile;

retrieve skills of the worker related to the activity from a worker profile;

retrieve capabilities of the wearable robotic system related to the activity from a wearable robotic system profile;

perform an analysis of the details of the activity that the worker is preparing to perform utilizing the wearable robotic system, the skills of the worker related to the activity, and the capabilities of the wearable robotic system related to the activity;

determine an aggregation of the skills of the worker and the capabilities of the wearable robotic system to perform the activity based on the analysis;

determine that the worker can perform the activity utilizing the wearable robotic system based on the aggregation of the skills of the worker and the capabilities of the wearable robotic system;

automatically configure physical movement parameters of the wearable robotic system to guide the worker through a plurality of steps to complete the activity;

monitor performance of the activity by the worker utilizing the wearable robotic system via the real-time data feeds from the set of IoT sensors;

analyze the real-time data feeds to identify a plurality of actionable activities; and responsive to the identifying of the plurality of actionable activities, performing at least one action from the plurality of actionable activities wherein the at least one action further comprises:

generate, by the computer, physical resistance forces via the wearable robotic system to prevent movement errors of the worker.

15. The computer program product of claim 14, wherein the program instructions further cause the computer to:

configure the wearable robotic system to the worker to guide the worker via the wearable robotic system through a plurality of steps to complete the activity with precision in response to determining that the worker can perform the activity utilizing the wearable robotic system.

16. The computer program product of claim 14, wherein the program instructions further cause the computer to:

monitor performance of the activity by the worker utilizing the wearable robotic system using a data feed received from a set of sensors located within a work environment.

17. The computer program product of claim 14, wherein the program instructions further cause the computer to:

identify a set of prohibited movements for the activity based on the analysis, wherein the set of prohibited movements comprise specific ranges of motion that exceed safety parameters defined in the activity profile;

continuously monitoring, by the computer, movements of the worker during performance of the activity; and prevent the worker from performing any of the set of prohibited movements by automatically controlling the wearable robotic system to restrict motion when the set of IoT sensors detect an attempt to perform any movement in the set of prohibited movements.

18. The computer program product of claim 14, wherein the program instructions further cause the computer to:

move the worker away from a dangerous working condition utilizing the wearable robotic system in response to detecting that the worker is at least one of within a defined minimum safe distance from the dangerous working condition and has exceeded a defined maximum time threshold corresponding to the dangerous working condition.

19. The computer program product of claim 14, wherein the program instructions further cause the computer to:

determine a level of completion of the activity performed by the worker utilizing the wearable robotic system based on monitoring performance of the activity by the worker utilizing the wearable robotic system using a data feed received from a set of sensors located within a work environment;

determine whether the worker completed the activity based on the level of completion of the activity; and remove one or more steps of a plurality of steps corresponding to the activity to optimize efficiency of the wearable robotic system while performing the activity based on historic learning of the activity by a set of machine learning models in response to determining that the worker has completed the activity based on the level of completion of the activity.

20. The computer program product of claim 14, wherein the program instructions further cause the computer to:

receive a data feed via a network from a set of sensors located within a work environment;

perform an analysis of the data feed received from the set of sensors located within the work environment; and determine that the worker is preparing to perform the activity in the work environment utilizing the wearable robotic system based on the analysis of the data feed received from the set of sensors located within the work environment.

\* \* \* \* \*